United States Patent [19]

Yeager

[11] Patent Number: 4,863,998

[45] Date of Patent: Sep. 5, 1989

[54] POLYPHENYLENE ETHER AMINE SALTS, FLAME RETARDANT EXTRUDATE OF BLENDS THEREOF, AND METHOD OF MAKING

[75] Inventor: Gary W. Yeager, Schenectady, N.Y.

[73] Assignee: General Electric Company, Schenectady, N.Y.

[21] Appl. No.: 92,786

[22] Filed: Sep. 3, 1987

[51] Int. Cl.$^4$ .................. C05G 65/48; C05G 5/18; C05G 71/04
[52] U.S. Cl. ..................... 525/132; 525/390; 525/905
[58] Field of Search .................. 525/132, 905

[56] References Cited

U.S. PATENT DOCUMENTS

| | | |
|---|---|---|
| 4,477,651 | 10/1984 | White et al. ............ 528/215 |
| 4,517,341 | 5/1985 | White ................. 525/152 |
| 4,670,537 | 6/1987 | White ................. 525/391 |

*Primary Examiner*—Jacob Ziegler
*Attorney, Agent, or Firm*—William A. Teoli; James C. Davis, Jr.; William H. Pittman

[57] ABSTRACT

Polyphenylene ethers having chemically combined aminoalkyl groups are neutralized with a Brönsted acid to produce flame retardant polyphenylene ether Brönsted acid amine salts. The polyphenylene ether amine salts can be blended with polystyrene to produce flame retardant blends.

5 Claims, No Drawings

POLYPHENYLENE ETHER AMINE SALTS, FLAME RETARDANT EXTRUDATE OF BLENDS THEREOF, AND METHOD OF MAKING

REFERENCE TO COPENDING APPLICATION

Reference is made to copending applications of G. Yeager et al., Ser. No. 092,784, now U.S. Pat. No. 4,757,107 and Ser. No. 092,785, filed concurrently herewith and incorporated herein by reference.

BACKGROUND OF THE INVENTION

As discussed in U.S. Pat. Nos. 4,024,093 (Abolins et al.) and 4,670,537 (White) assigned to the same assignee as the present invention and incorporated herein by reference, polyphenylene ethers can be made by the oxidative coupling of a phenol in the presence of a metal amine complex catalyst. As shown by U.S. Pat. No. 4,670,537, polyphenylene ethers formed by the aforementioned oxidative coupling reaction can be substituted with chemically combined alkylamino endgroups. It is further shown in U.S. Pat. No. 3,383,435, Cizek, assigned to the same assignee as the present invention and incorporated herein by reference, that polyphenylene ethers can be blended with styrene resins over wide portions by weight to provide a wide variety of high performance thermoplastics.

Considerable effort has been made to improve the flame retardant properties of both polyphenylene ethers and blends thereof. Generally, various compounds, such as hexabromobiphenyl, and a metallic salt, such as an organic iron compound, for example, a ferric salt of an organic carboxylic acid, such as ferric stearate, have been used to impart improved flame retardant properties, particularly to polyphenylene ether blends without substantially reducing the impact properties of the resulting flame retardant thermoplastic.

The present invention is based on my discovery that polyphenylene ether substituted with alkylamino groups can be neutralized with a Brönsted acid, as defined hereinafter, to produce the corresponding polyphenylene ether Brönsted acid amine salt. Reaction can be effected in the presence of a substantially inert organic solvent between a Brösted acid and an alkylamino substituted polyphenylene ether. Surprisingly, blending of the resulting polyphenylene ether Brösted acid amine salt with polystyrene, or HIPS, followed by the extrusion thereof, as defined hereinafter, results in the production of extrudate having substantially improved flame retardant properties. The extrudate does not have to be further modified with an additional flame retardant. However, if V-0 flame retardant results are desired, in accordance with UL 94 Flammability of Plastics Materials for Parts in Devices and Appliances, June 1, 1973, a relatively small amount of a flame retardant, such as a brominated polycarbonate oligomer (FR-25) can be added to the blend, preferably prior to extrusion.

As used hereinafter, the term "extrudate" means a blend of polyphenylene ether amine salt and styrene resin which has been melt extruded in contact with a ferruginous surface.

STATEMENT OF THE INVENTION

There is provided by the present invention, a method for making polyphenylene ether Brönsted acid amine salts useful for making flame retardant extrudate of blends thereof comprising, (1) agitating an inert organic solvent solution of a polyphenylene ether having from about 0.2–2 milligrams of nitrogen in the form of chemically combined —NRR$^1$ radicals, per gram of polymer and at least a neutralizing amount of a Brönsted acid to produce a polyphenylene ether Brönsted acid amine salt, (2) effecting the precipitation of the polyphenylene ether Brönsted acid amine salt from the solution of (1), and (3) recovering the polyphenylene ether Brönsted acid amine salt from the mixture of (2), where R is selected from a $C_{(1-8)}$ alkyl or branched alkyl radical, and $R^1$ is selected from hydrogen or R.

Another aspect of the present invention is directed to polyphenylene ether Brönsted acid amine salts comprising polyphenylene ether having from 0.2–2 milligrams of nitrogen in the form of chemically combined Brönsted acid amine units of the formula, $$A^-H^+$$
$$-NRR^1,$$

per gram of polymer, where R and $R^1$ are as previously defined, and $Al^-$ is a Brönsted acid anion.

In a further aspect of the present invention, there is provided flame retardant extrudate of polyphenylene ether Brönsted acid amine salt blends comprising by weight, (A) from about 30 to 60 percent of polyphenylene ether Brönsted acid amine salt, and (B) from about 70 to 40 percent of polystyrene.

The polyphenylene ethers which can be utilized in the practice of the present invention to make polyphenylene ether Brönsted acid amine salts include polyphenylene ethers comprising a plurality of structural units having the formula

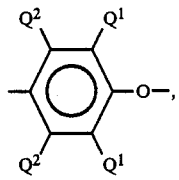

(1)

where in each of said units, independently, each $Q^1$ is halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are known. The homopolymers include those containing, for example, 2,6-dimethyl-1,4-phenylene ether units. The copolymers include random copolymers containing such units in combination with (for example) 2,3,6-trimethyl-1,4-phenylene ether units. Many suitable random copolymers, as well as homopolymers, are disclosed in the patent literature.

Particularly useful are poly(2,6-dimethyl-1,4-phenylene ethers). Suitable polymers generally have a number average molecular weight within the range of about 5,000–40,000 and a weight average molecular weight within the range of about 20,000–80,000, as determined by gel permeation chromatography. Their intrinsic viscosities are preferably in the range of about 0.35–0.6 dl/g, as measured in chloroform at 25° C.

Also known are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrene and elastomers. The product typically contains both grafted and ungrafted moieties. Other polyphenylene ethers are coupled polymers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

Polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. For the most part, they contain at least one heavy metal compound such as a copper, manganese or cobalt compound, usually in combination with various other materials.

Catalyst systems containing a copper compound are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Other catalyst systems contain manganese compounds. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also known are cobalt-containing catalyst systems. Suitable manganese and cobalt-containing catalyst systems for polyphenylene ether preparation are known in the art by reason of disclosure in numerous patents and publications.

The present invention preferably relates to polyphenylene ethers comprising molecules having end groups of the formula

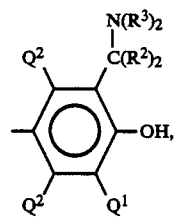

(hereinafter "alkylamino end groups"), wherein $Q^1$ and $Q^2$ are as previously defined; each $R^2$ is independently hydrogen or alkyl, with the proviso that the total number of carbon atoms in both $R^2$ radicals is 6 or less; and each $R^3$ is independently hydrogen or a $C_{(1-6)}$ primary alkyl radical. Preferably, each $R^2$ is hydrogen and each $R^3$ is alkyl, especially methyl or n-butyl.

Such polymers are typically obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of the reaction is the $Q^1$ radical adjacent to the hydroxy group on the terminal unit of the polymer chain. During further processing and/or blending, the aminoalkyl end groups may undergo various reactions, probably involving a quinone methide-type intermediate of the formula

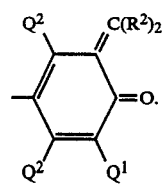

These alkylamino end groups have numerous effects on the chemistry of the polyphenylene ether. Many of these effects are beneficial, often including an increase in impact strength and compatibilization with other blend components. Reference is made to U.S. Pat. Nos. 4,054,553, 4,092,294, 4,477,649, 4,477,651 and 4,517,341, the disclosure of which are incorporated by reference herein.

Some of the Brönsted acids which can be utilized in the practice of the present invention are, for example, HBr, HCl, HI, HO, $HO_3SR$, where R is $C_{(1-8)}$ alkyl or $C_{(6-14)}$ aryl radical.

The polyphenylene ethers which have been neutralized in accordance with the practice of the present invention with a Brönsted acid can be blended with polyvinylaromatic resins which preferably having at least 25 mol percent of chemically combined vinyl aromatic resin units of the formula

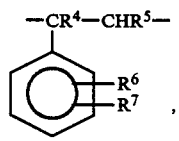

wherein $R^4$ and $R^5$ are selected from the group consisting of hydrogen and lower alkyl or alkenyl groups of from 1 to 6 carbon atoms; $R^6$ and $R^7$ are selected from the group consisting of chloro, bromo, hydrogen and lower alkyl of from 1 to 6 carbon atoms.

Materials that can be copolymerized with the vinyl aromatic monomer used to make units of formula (4), are those having the general formula

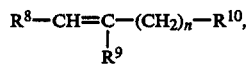

where $R^8$ and $R^9$ are members selected from the class consisting of hydrogen, halogen, an alkyl group of 1-4 carbon atoms, carboalkoxy or $R^8$ and $R^9$ taken together can be an anhydride linkage (—COOOC—), and $R^{10}$ is selected from hydrogen, vinyl, an alkyl or alkenyl group having 1 to 12 carbon atoms, cycloalkyl, carboalkoxy, alkoxy-alkyl, alkyl carboxy, ketoxy, halogen, carboxy, cyano or pyridyl and n is a whole number between 0 and 9.

The general formula set forth includes by way of example, homopolymers such as polystyrene and monochloropolystyrene, the modified polystyrenes, such as rubber-modified, high-impact polystyrene and styrene containing copolymers, such as the styrene acrylonitrile copolymers, styrene butadiene copolymers, styrene-acrylonitrile-alkyl styrene copolymers, styrene-acrylonitrile-butadiene copolymers, polymethylstyrene, copolymers of ethylvinylbenzene, and divinylbenzene; styrene-maleic anhydride copolymers; styrene-butadiene-styrene block copolymers and styrene-butadiene block copolymers; and styrene-butadiene-styrene maleic anhydride block copolymers.

The flame retardant blends of the present invention also can include reinforcing fillers such as glass roving, glass fiber, mineral clay, mica and silica. In addition, impact modifiers such as KG-1651, flame retardants such as brominated polystyrene or brominated polycarbonate oligomers, flow parameters, plasticizers, or antioxidants. The reinforcing fillers can be present at up to 50 parts by weight of filler per 100 parts by weight of blend. The compositions of the present invention can be prepared by blending in a Henschel mixer and thereafter compounded in a Werner-Pfleiderer extruder. The extrudate can be chopped into pellets and molded on a Newbury injection molding machine.

In order that those skilled in the art will be better able to practice the invention, the following examples are given by way of illustration and not by way of limitation. All parts are by weight.

EXAMPLE 1

There was slowly added 600 grams of polyphenylene ether having an intrinsic viscosity of 0.47 in chloroform at ~25° C. having approximately 900 parts per million of chemically combined nitrogen in the form of di-n-butylamine radicals to 4 liters of chloroform. After all the polyphenylene oxide had dissolved, an excess of HBr was bubbled through the solution over a period of 3 hours. Methanol was then added to the solution to affect precipitation of polymer. The resulting solid was filtered and dried in a vacuum oven at 50° C. for about 12 hours. Based on method of preparation, there was obtained a polyphenylene ether having chemically combined di-n-butylammonium hydrobromide. The identity of the product was further confirmed by $^{13}$C-NMR chemical shifts showing 53.4 ppm (Ar—CH$_2$—N), 53.2 ppm (N—CH$_2$—Pr), 24.9 ppm (N—CH$_2$—CH$_2$—Et), 20.1 ppm (N—(CH$_2$)—CH$_2$—CH$_3$), 13.4 (N—(CH$_2$)$_3$—CH$_3$). Elemental analysis of the product showed it contained 0.45 wt % of bromine.

EXAMPLE 2

The same procedure of Example 1 was repeated except that HCl gas was substituted for gaseous HBr. There was obtained a polyphenylene ether having chemically combined amine hydrochloride. $^{13}$C-NMR chemical shifts of chemically combined di-n-butylammonium hydrochlorides showed 54.0 ppm (Ar—CH$_2$—N), 52.1 ppm (N—CH$_2$—Pr), 24.5 ppm (N—CH$_2$—CH$_2$—Et), 19.8 ppm (N—(CH$_2$)$_2$—CH$_3$), 13.4 ppm (N—(CH$_2$)$_3$—CH$_3$). Elemental analysis showed that there was 0.19 weight percent of chemically combined chlorine.

EXAMPLE 3

The procedure of Example 1 was repeated except that there was utilized 50 grams of methane sulfonic acid in place of the hydrogen bromide gas. Analysis of the final product with $^{13}$C-NMR showed chemical shifts of polymer bond di-n-butyl ammonium methane sulfonates 53.2 ppm (Ar—CH$_2$—N), 53.0 ppm (N—CH$_2$—Pr), 24.7 ppm (N—CH$_2$—CH$_2$—Et), 21.3 ppm (N—(CH$_2$)$_2$—CH$_2$—CH$_3$), 13.6 ppm (N—(CH$_2$)$_3$—CH$_3$). Elemental analysis for sulfur showed that there was about 0.30 weight percent.

EXAMPLE 4

The procedure of Example 1 was repeated except that there was utilized 100 grams of p-toluene sulfonic acid monohydrate was the Brönsted acid. $^{13}$C-NMR analysis of the resulting polymer showed di-n-butylammonium p-toluene sulfonates, 53.07 ppm (Ar—CH$_2$—N), 52.8 ppm (N—CH$_2$—Pr), 24.6 ppm (N—CH$_2$—CH$_2$—Et), 19.75 (N—(CH$_2$)$_2$—CH$_2$—CH$_2$), 13.4 (N—(CH$_2$)$_3$—CH$_3$). Elemental analysis of the polymer showed 0.37 weight percent of sulfur.

EXAMPLE 5

Equal parts by weight of the polyphenylene ether hydrobromide salt of Example 1 and high impact polystyrene (HIPS) were blended in a Henschel mixer. The dry blend was extruded in a Haake corotating twin extruder (Zone 1,2—265° C., Nozzel—270° C.) at 120 rpm. The extrudate was quenched in water and pelletized. The pellets were molded into 5"×0.5"×0.125" bars using a 15-ton Boy molder (Zone 1—230° C., Zone 2—270° C., Nozzel—280° C.). The same procedure was used to make pellets of the polyphenylene ether salt high impact polystyrene blends of Examples 2, 3 and 4. Flame-out times (FOT) were determined by UL 94 Standard for Tests, *Flammability of Plastics Materials for Parts in Devices and Appliances*, Underwriters Laboratories (June 1, 1973). Notched Izod impact strengths were determined as per ASTM Bulletin D256. Pellets were also made from a blend of equal parts of untreated polyphenylene ether and high impact polystyrene (HIPS) utilizing the same materials as shown in Example 1. The following results were obtained, where "PPE" is polyphenylene ether:

TABLE 1

PPE.HA/HIPS (50/50 wt/wt) Extruded Blends

| Entry | Composition | FOT (sec) | N-Izod (ft-lbs/in) |
|---|---|---|---|
| 1 | PPE/HIPS | 36.0 | 4.3 |
| 2 | PPE.HBr/HIPS | 11.5 | 1.1 |
| 3 | PPE.HCl/HIPS | 13.7 | 0.6 |
| 4 | PPE.HO$_3$SCH$_3$/HIPS | 11.2 | 1.1 |
| 5 | PPE.HO$_3$SOCH$_3$/HIPS | 11.9 | 1.0 |

The above results show that the substantial enhancement in flame-out time was experienced by the extruded polyphenylene ether-HIPS blends utilizing Brönsted acid treated polyphenylene ether of the invention as compared to the untreated polyphenylene ether. A reduction in notched izod impact is also shown utilizing the Brönsted acid treated polyphenylene ether.

In order to determine whether the impact strength of the Brönsted acid treated polyphenylene ether blends could be raised without effecting flame retardancy, a blend utilizing the HBr treated polyphenylene ether of Example 1 was combined with varying amounts of Kraton G 1651 elastomer. The impact results are shown as follows:

TABLE 2

PPE.HBr/HIPS Extruded Blends (50/50 wt/wt) with KG 1651

| Entry | % KG 1651 (wt) | N-Izod (ft-lbs/in) | FOT (sec) |
|---|---|---|---|
| 1 | 0.0 | 1.1 | 11.5 |
| 2 | 2.4 | 4.8 | 11.3 |
| 3 | 4.8 | 5.7 | 11.1 |
| 4 | 9.1 | 8.1 | 10.8 |

The above results show that the addition of as little as 2.4% by weight of Kraton G 1651 to the HBr treated polyphenylene ether blend of the present invention significantly improves the notched izod impact value of the extruded blend without substantially affecting the flame-out time of the extruded blend.

The further evaluation of the HBr treated polyphenylene ether extruded blend was made with respect to improving its flame retardancy by the addition of a brominated polycarbonate oligomer (FR-25) or a brominated polystyrene (68PB). The following results were obtained:

TABLE 3

PPE.HBr/HIPS Extruded Blends (50/50 wt/wt) with FR-25 or 68PB

| Entry | % FR-25 | % 68-PB | % Br | FOT (sec) |
|---|---|---|---|---|
| 1 | — | — | 0 | 10.1 |
| 2 | 2.3 | — | 1.4 | 5.7 |
| 3 | 4.6 | — | 2.7 | 3.6 |
| 4 | — | 2.0 | 1.4 | 4.8 |
| 5 | — | 3.9 | 2.7 | 5.4 |

The above results show that a significant enhancement in flame retardancy can be achieved by utilizing minor amounts of a standard flame retardants.

A further flammability study was made with respect to the effect of varying the proportions of the Brönsted acid treated polyphenylene ether to the high impact polystyrene in the blend. The following results were obtained:

TABLE 4

Flammability of PPE.HBr/HIPS Extruded Blends

| Entry | PPE.HBr/HIPS (wt/wt) | FOT (sec) |
|---|---|---|
| 1 | 60/40 | 5.0 |
| 2 | 50/50 | 11.5 |
| 3 | 30/70 | 17.3 |
| 4 | 20/80 | FD* |

*Flaming Drip

The above results show that improved flame retardancy is achieved by maintaining at least a 30% by weight of Brönsted acid treated polyphenylene ether in the blend.

Although the above examples are directed to only a few of the very many variables which can be used in the practice of the present invention, it should be understood that the present invention is directed to a much broader variety of Brönsted acid treated polyphenylene ethers and blends thereof as shown in the description preceeding these examples.

What is claimed and sought to be protected by Letters Patent of the United States is as follows:

1. A flame retardant extrudate of a blend comprising by weight,
   (A) from about 30 to 60% of a polyphenylene ether Brösted acid amine salt, and
   (B) from about 70 to 40% of polystyrene.

2. A flame retardant extrudate in accordance with claim 2, where the polyphenylene ether Brönsted acid amine salt possesses a bromide anion.

3. A flame retardant extrudate in accordance with claim 1, where the polyphenylene ether Brönsted acid amine salt possesses a chloride anion.

4. A flame retardant extrudate in accordance with claim 1, where the polyphenylene ether Brönsted acid amine salt possesses a methane sulfonate anion.

5. A flame retardant extrudate in accordance with claim 1, where the polyphenylene ether Brönsted acid amine salt possesses a p-toluene sulfonate anion.

* * * * *